United States Patent [19]
Hoda et al.

[11] Patent Number: 6,121,744
[45] Date of Patent: Sep. 19, 2000

[54] CONTROL APPARATUS FOR POSITION CONTROL MOTOR

[75] Inventors: Akihiko Hoda; Kazuo Abe, both of Kashiwa, Japan

[73] Assignee: Oriental Motor Co., Ltd., Tokyo, Japan

[21] Appl. No.: 09/266,947

[22] Filed: Mar. 12, 1999

[30] Foreign Application Priority Data

Mar. 13, 1998 [JP] Japan ................................. 10-062655

[51] Int. Cl.[7] .................................................. G05B 19/40
[52] U.S. Cl. .......................... 318/685; 318/687; 318/671
[58] Field of Search .................................... 318/685, 600, 318/601, 603, 624, 687, 661, 671

[56] References Cited

U.S. PATENT DOCUMENTS

| | | | |
|---|---|---|---|
| 4,409,530 | 10/1983 | Neeper et al. | 318/685 |
| 4,520,302 | 5/1985 | Hill et al. | 318/696 |
| 4,772,815 | 9/1988 | Harned et al. | 310/171 |
| 4,959,599 | 9/1990 | Nakadai et al. | 318/603 |
| 5,175,479 | 12/1992 | Tajima et al. | 318/560 |
| 5,416,395 | 5/1995 | Hiramatsu et al. | 318/600 |
| 5,493,188 | 2/1996 | Yoshikawa et al. | 318/254 |
| 5,543,696 | 8/1996 | Haggett et al. | 318/590 |
| 5,757,149 | 5/1998 | Sato et al. | 318/135 |

*Primary Examiner*—Paul Ip
*Assistant Examiner*—Reba Leykin

[57] ABSTRACT

Disclosed is a control apparatus for a position control motor, which allows the rotor of the motor to follow up to a command position without step out, can ensure highly reliable positioning, and is stable with respect to a variation in load. This position control apparatus comprises a position detecting section for detecting a rotor position of the position control motor, a control section for comparing an output signal of the position detecting section with a command position signal and outputting a signal corresponding to an electric current to flow in windings of the motor based on a deviation between the output signal and the command position signal, and a drive section for outputting an electric current to be supplied to the windings of the motor based on an output signal of the control section, and controls the position of the motor based on the command position signal. The control section outputs a sine-wave data signal corresponding to the command position signal from a sine-wave data table when the deviation lies within an electrical angle of 90 degrees, and outputs a sine-wave data signal, which excites the motor in such a way that the motor comes to an excitation stable point leading to the rotor position by an electrical angle of 90 degrees, from the sine-wave data table when the deviation exceeds an electrical angle of 90 degrees.

7 Claims, 11 Drawing Sheets

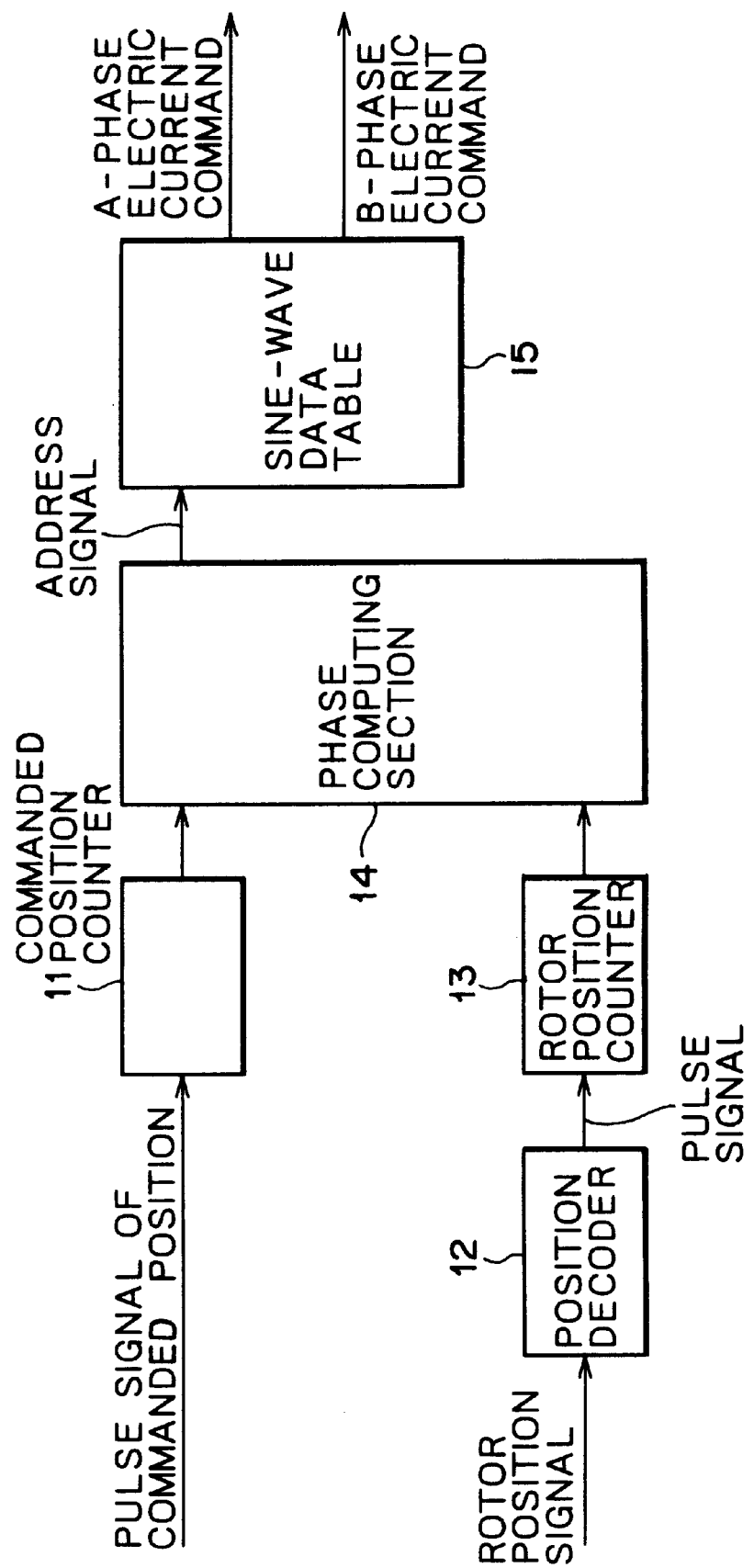

F I G. 4A
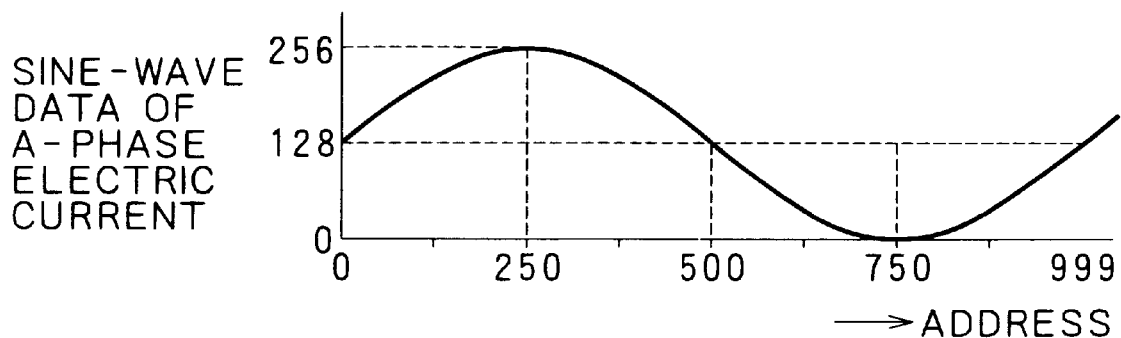
F I G. 4B
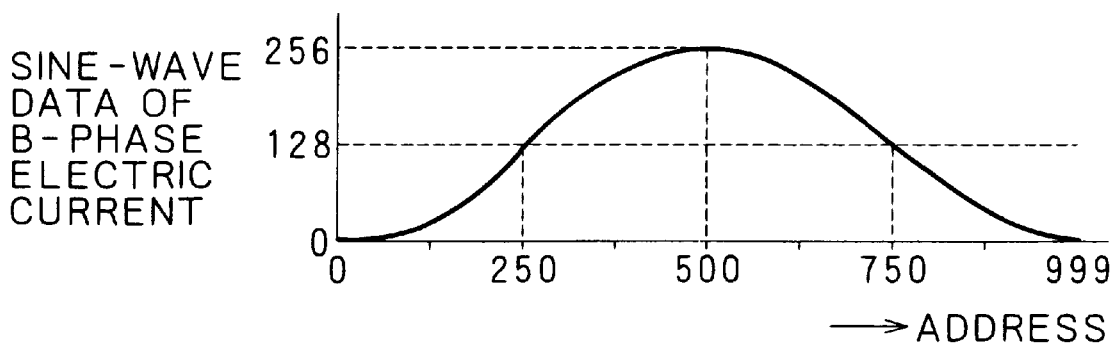

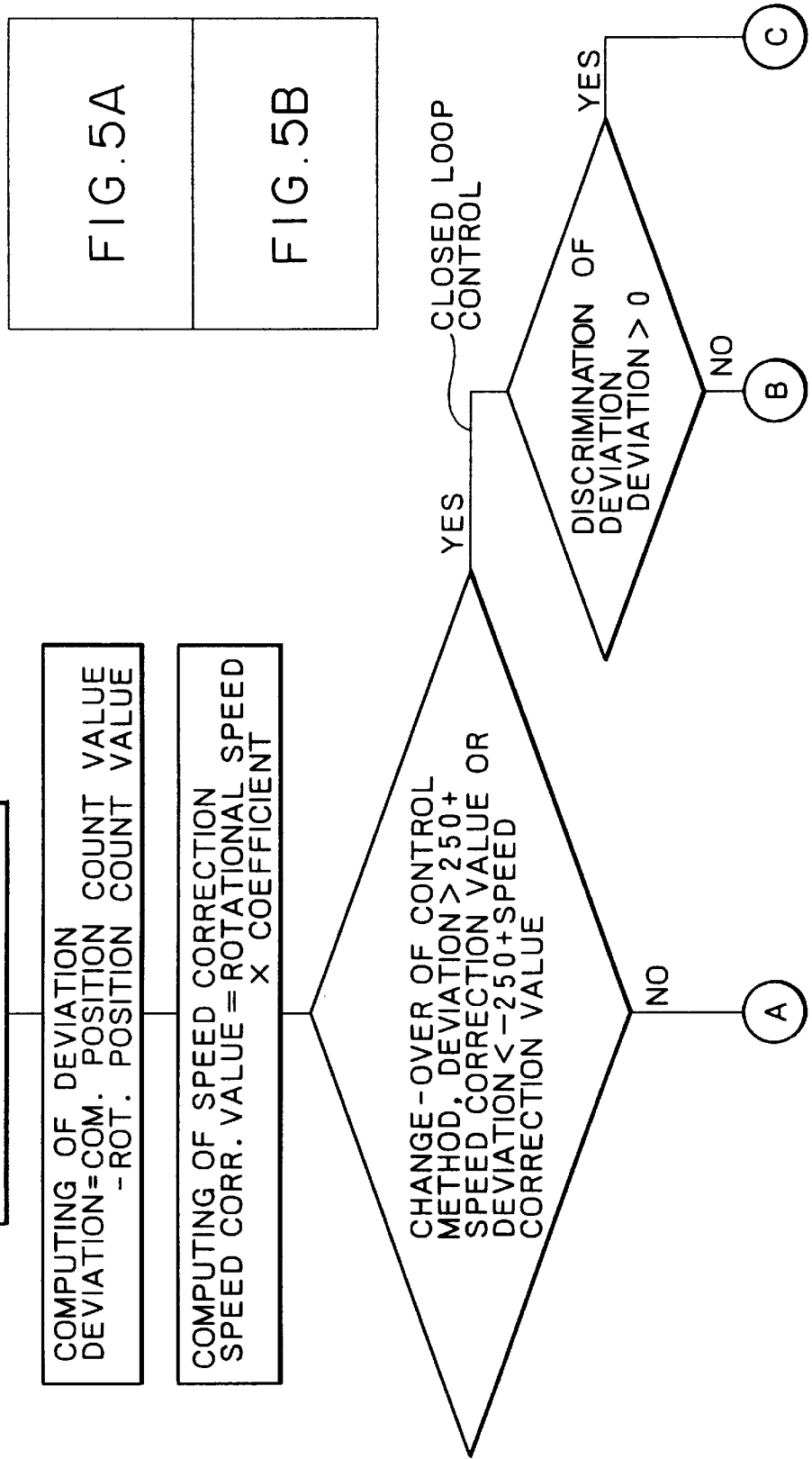

FIG. 7A

| Range signal of deviation | L | L | L | L | L | L | L | L | L | L | L | L | L | L | L | L | L | L | L | L | L |
|---|---|---|---|---|---|---|---|---|---|---|---|---|---|---|---|---|---|---|---|---|---|
| Direction signal of deviation | X | L | L | L | L | L | L | L | L | L | L | L | L | L | L | L | L | L | L | L | L |
| Command count value | X | 0 | 1 | 2 | 3 | 4 | 5 | 6 | 7 | 8 | 9 | 10 | 11 | 12 | 13 | 14 | 15 | 16 | 17 | 18 | 19 |
| Command count value of rotor position | X | X | X | X | X | X | X | X | X | X | X | X | X | X | X | X | X | X | X | X | X |
| Excitation position | 0 | 1 | 2 | 3 | 4 | 5 | 6 | 7 | 8 | 9 | 10 | 11 | 12 | 13 | 14 | 15 | 16 | 17 | 18 | 19 |   |

FIG. 7B

| Range signal of deviation | H | H | H | H | H | H | H | H | H | H | H | H | H | H | H | H | H | H | H | H | H |
|---|---|---|---|---|---|---|---|---|---|---|---|---|---|---|---|---|---|---|---|---|---|
| Direction signal of deviation | H | H | H | H | H | H | H | H | H | H | H | H | H | H | H | H | H | H | H | H | H |
| Command count value | X | 0 | 1 | 2 | 3 | 4 | 5 | 6 | 7 | 8 | 9 | 10 | 11 | 12 | 13 | 14 | 15 | 16 | 17 | 18 | 19 |
| Command count value of rotor position | X | X | X | X | X | X | X | X | X | X | 10 | 11 | 12 | 13 | 14 | 15 | 16 | 17 | 18 | 19 | X |
| Excitation position | 5 | 6 | 7 | 8 | 9 | 10 | 11 | 12 | 13 | 14 | 15 | 16 | 17 | 18 | 19 | 0 | 1 | 2 | 3 | 4 |   |

FIG. 7C

| Range signal of deviation | H | H | H | H | L | L | L | L | L | L | L | L | L | L | L | L | L | L | L | L | L |
|---|---|---|---|---|---|---|---|---|---|---|---|---|---|---|---|---|---|---|---|---|---|
| Direction signal of deviation | H | H | L | L | L | L | L | L | L | L | L | L | L | L | L | L | L | L | L | L | L |
| Command count value | X | 0 | 1 | 2 | 3 | X | 0 | 1 | 2 | 3 | 4 | 5 | 6 | 7 | 8 | 9 | 10 | 11 | 12 | 13 | 14 |
| Command count value of rotor position | X | X | X | X | X | X | X | X | X | X | X | X | X | X | X | X | X | X | X | X | X |
| Excitation position | 15 | 16 | 17 | 18 | 19 | 0 | 1 | 2 | 3 | 4 | 5 | 6 | 7 | 8 | 9 | 10 | 11 | 12 | 13 | 14 |   |

X MARK: UNRELATED

FIG. 9

| EXCITATION POSITION | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SWITCHING ELEMENT Q1 | O | O | O |   |   |   |   |   |   |   |   |   |   |   |   |   |   |   | O | O |
| Q2 |   |   | O | O | O |   |   |   |   |   |   |   |   |   |   |   |   |   |   |   |
| Q3 |   |   |   | O |   | O | O |   |   |   |   |   |   |   |   |   |   |   |   |   |
| Q4 |   |   |   |   | O |   |   |   | O | O |   |   | O | O |   |   | O |   |   |   |
| Q5 |   |   |   |   |   |   |   | O | O | O | O |   | O | O | O | O |   |   |   |   |
| Q6 | O |   |   |   |   |   |   |   |   | O | O |   |   |   |   |   |   |   |   |   |
| Q7 |   |   |   |   |   |   |   |   |   |   | O | O | O |   | O |   | O | O | O | O |
| Q8 | O | O | O | O |   |   |   |   |   |   |   |   |   |   | O | O | O |   |   |   |
| Q9 |   |   |   |   |   |   |   |   |   |   |   |   |   |   |   |   |   | O | O |   |
| Q10 |   |   |   |   | O | O | O | O | O |   |   |   |   |   |   |   |   |   |   |   |

O MARK : SWITCH ON

CONTROL APPARATUS FOR POSITION CONTROL MOTOR

BACKGROUND OF THE INVENTION

Field of the Invention and Related Art Statement

The present invention relates to a control apparatus for a position control motor, such as a brushless motor or a stepping motor, and an apparatus which implements position control while preventing the hunting of a stepping motor.

Conventional control apparatuses of this type for a position control motor like a brushless motor or a stepping motor include a typical open loop control apparatus for a stepping motor and a closed loop control apparatus for an AC servo motor, which performs position control using a position detector like an encoder or resolver, etc.

The control apparatus for a stepping motor can implement high-precision position control easily and at a low cost simply by switching one excitation sequence for the stepping motor to another, and has therefore been used widely.

That is, such an open loop control apparatus changes over the excitation of the motor in response to a position command regardless of the rotor position.

Because of the open loop control employed, however, once the stepping motor goes asynchronous due to the vibration of the stepping motor itself, variations of the load, external influence or the like, the stepping motor cannot follow positions specified by control commands, thus so-called stepping out occurs and the actual stop position is shifted from the position specified by the control command. Where high reliability is required, therefore, it is necessary to use a large motor which has a sufficient margin for the needed torque or to use another motor like a servo motor.

Further, the closed loop control apparatus detects the rotor position by means of the aforementioned position detector and feeds back this information. Normally, the phase of the excitation current of the motor is controlled so that the phase is in an excitation stable point which is ahead of the rotor position by an electrical angle of 90 degrees.

FIG. 11 illustrates the relationship between the rotor displacement and the generated torque for the open loop control apparatus when a constant electric current is supplied to the stepping motor. This relationship between the rotor displacement and the generated torque shows that the generated torque becomes maximum when the displacement reaches 90 degrees, that a torque which causes the rotor to get back to the original position is generated within ±180 degrees, and that in a range of over ±180 degrees, a torque which moves the rotor to a different stable point, not to the original position, is generated positional deviations occur.

When the rotor of the motor cannot respond to the change-over of an electric current, therefore, step out of the motor occurs, resulting in lower position control reliability.

As mentioned above, the closed loop control apparatus controls the phase of the excitation current of the motor in such a manner that the phase comes to an excitation stable point which is ahead of the rotor position by an electrical angle of 90 degrees. Since the rotor position does not coincide with the excitation stable point, the rotor cannot stop fully and generates small vibrations. As the level of the exciting current is controlled by feedback of the position, speed and so forth, this feedback control causes an inevitable delay which requires, for example, the loop gain to be adjusted.

In this case, the following shortcomings would arise.

(1) The closed loop gain should be adjusted with respect to a variation in the load. Stable control against such load variations is complicated.

(2) Microvibration (hunting) occurs when the rotor stops.

(3) Due to the inevitable feedback-originated delay in control, synchronism to a command may be lost.

For the conventional open loop control apparatus, the use of a large-capacity motor results in an increased motor size, which stands in the way of making the control apparatus itself compact. Even if the motor size is increased, step out cannot be eliminated completely so that the reliability is not still assured.

The closed loop control apparatus for a servo motor or the like, on the other hand, can eliminate step out of the motor. Because the level of the electric current which is supplied to a servo motor is generally controlled based on a deviation of the actual position from a commanded position, however, the control is complex, leading to an increased cost.

This closed loop control apparatus also suffers the occurrence of microvibration when the motor stops, and difficulty in keeping the stability of the control system with respect to load changes.

OBJECT AND SUMMARY OF THE INVENTION

Accordingly, it is a primary object of the present invention to provide a control apparatus for a position control motor, which allows the rotor of the motor to follow commanded positions without stepping out, can ensure highly reliable positioning, is stable with respect to load variations, and causes no microvibration (hunting) when the rotor stops, thereby ensuring excellent synchronism to a position command.

It is another object of this invention to provide a compact, inexpensive and highly reliable control apparatus for a position control motor which neither employs complicated control nor has a step out problem.

To achieve the above objects, according to this invention, a position control apparatus for a position control motor, such as a brushless motor or a stepping motor, for controlling the position of the motor in accordance with a command position signal, comprises a position detecting section for detecting a rotor position of the motor, a control section for comparing an output signal of the position detecting section with the command position signal and outputting a signal corresponding to an electric current to flow in windings of the motor based on a deviation between the output signal and the command position signal, and a drive section for outputting an electric current to be supplied to the windings of the motor based on an output signal of the control section, and has the following characteristics.

(1) The control section outputs a sine-wave data signal corresponding to the command position signal according to a sine-wave data table (or a sine-wave table) when the deviation lies within an electrical angle of 90 degrees, and it outputs a sine-wave data signal which excites the motor in such a way that the motor comes to an excitation stable point ahead of the rotor position by an electrical angle of 90 degrees, from the sine-wave data table when the deviation exceeds an electrical angle of 90 degrees.

(2) In the control section of (1) above, the control section includes a command position counter which counts command position pulse signals, a rotor position counter which counts position detection pulse signals, from the position detecting section, a phase computing section which receives pulse signals from the two counters and outputs an address signal for the sine-wave data table based on a deviation between the received pulse signals, and the sine-wave data table which provides a sine-wave data signal in response to the address signal from the phase computing section, wherein the phase computing section outputs the command position pulse signal when the deviation lies within an electrical angle of 90 degrees, and when the deviation exceeds an electrical angle of 90 degrees, the phase computing section corrects the position detection pulse signal by an electrical angle of 90 degrees, and then outputs the position detection pulse signal.

(3) In (2) above, the phase computing section has a function of correcting a rotational speed of the motor by adding an adequate speed correction value to an electric angle of 90 degrees and carry out computation.

With (1) to (3) above, a deviation between the commanded position and the detected rotor position is monitored, and the following two modes are provided and are changed from one to the other in accordance with the size of the deviation (electric angle). As apparent from FIG. 1 which shows the relationship between the rotor displacement (position) and the torque generated on the rotor, (a) when the size of deviations is −90° or more and ±90° or less, the mode is set to an ST mode (stepping motor mode) and the excitation status of the motor windings is changed according to this mode, and (b) when the size of deviations is smaller than −90° or greater than 90°, the mode is set to a BL mode (brushless motor mode) and the motor is excited in such a manner that the phase of the exciting current becomes an excitation stable point which leads to the rotor position by an electrical angle of 90 degrees.

With the above features, this invention can allow the rotor of the motor to follow commanded positions without stepping out, can ensure highly reliable positioning, can ensure stability with respect to load variations, and causes no microvibration (hunting) when the rotor stops, thereby ensuring excellent synchronism to position commands.

When a stepping motor is used, a motor with a large safety margin is normally selected in anticipation of a probable occurrence of step out. However, this invention is free from the step-out problem and is thus advantageous over the prior art in allowing the use of a smaller stepping motor.

(4) According to another aspect of this invention, the control section receives a deviation range signal and a deviation direction signal, and generates an excitation sequence which allows a commanded position specified by a position command value to be a stable point when the deviation range signal lies within a predetermined range; and the control section generates an excitation sequence which allows a position corresponding to the rotor position to be a stable point, based on the detected value of the rotor position and the deviation direction signal when the deviation range signal lies outside the predetermined range.

(5) In (4) above, the control section can control linear drive stepping or a linear stepping drive position.

(6) In (4) above, the control section can control a micro stepping drive position.

(7) In (4) above, when the deviation range signal lies outside a predetermined range, the control section further has an ability to perform speed correction on the excitation sequence which is generated in association with the deviation range signal and the detected value of the rotor position, based on a time-dependent change in the excitation sequence. This feature can ensure control even in a high-speed range.

With the features of (4) to (7) above, it is possible to provide a compact, inexpensive and highly reliable control apparatus which, unlike the prior art, neither employs complicated control nor faces a step-out problem.

As the positioning control apparatus of this invention can carry out position control merely by switching excitation sequences, it is cheaper and simpler than devices that use a servo motor. Further, when the motor stops, this control apparatus causes no microvibration and can thus be stable against load variations.

When a stepping motor is used, a motor with a large safety margin is normally selected in anticipation of a probable occurrence of stepping out. Like the control apparatus according to the first aspect of the invention, however, the control apparatus according to the second aspect is free from the step-out problem and is thus advantageous over the prior art in allowing the use of a smaller stepping motor.

BRIEF DESCRIPTION OF THE DRAWINGS

FIG. 3 is a block structural diagram of a control section in the control apparatus;

FIG. 4A is a diagram showing the relation of a sine-wave data signal value corresponding to the value of the A-phase electric current with an address signal value in a sine-wave data table;

FIG. 4B is a diagram showing the relation of a sine-wave data signal value corresponding to the value of the B-phase electric current with an address signal value in the sine-wave data table;

FIGS. 7A through 7C are diagrams showing the contents of data corresponding to addresses which are stored in a ROM (Read Only Memory) in an excitation sequence control section of the control apparatus;

FIG. 9 is a diagram illustrating the excitation sequence of the 5-phase stepping motor which is carried out by the excitation sequence control section;

DETAILED DESCRIPTION OF THE PREFERRED EMBODIMENTS

Preferred embodiments of the present invention will now be described in detail with reference to the accompanying drawings.

First Embodiment

Figure 1:
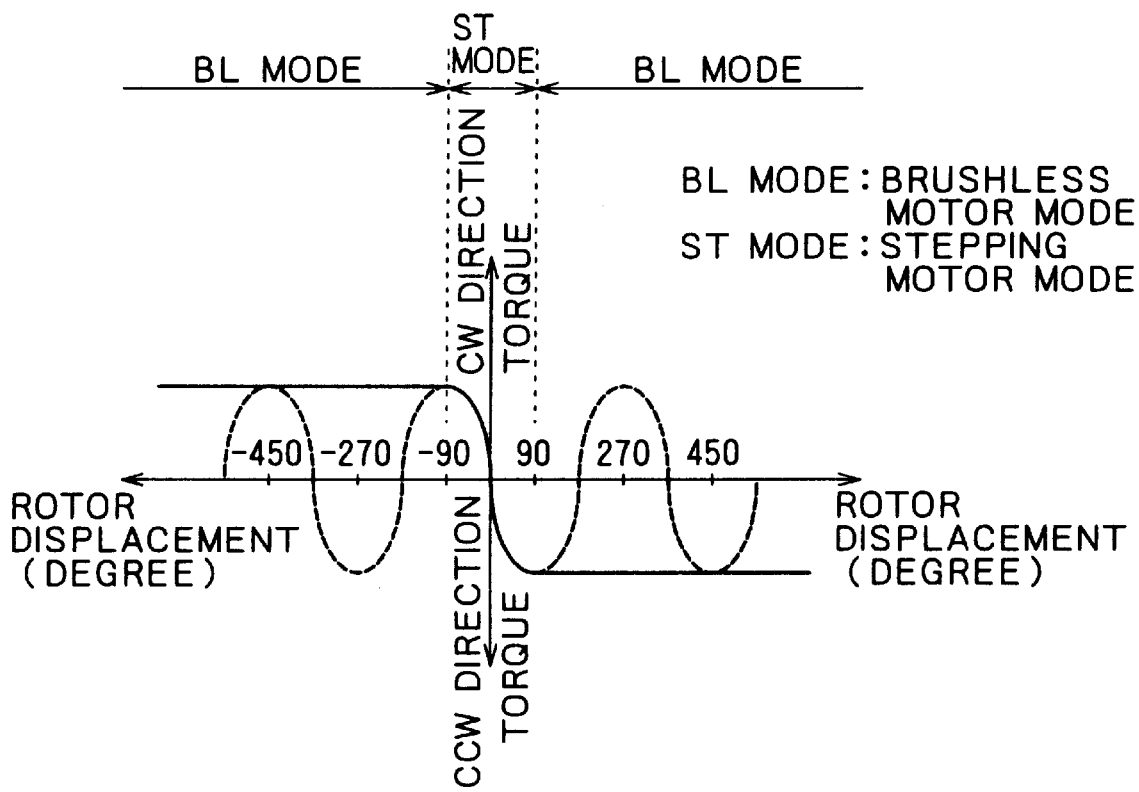
FIG. 1 is a diagram showing the relationship between the rotor displacement of a position control motor according to this invention and the generated torque, and various modes.
Figure 2:
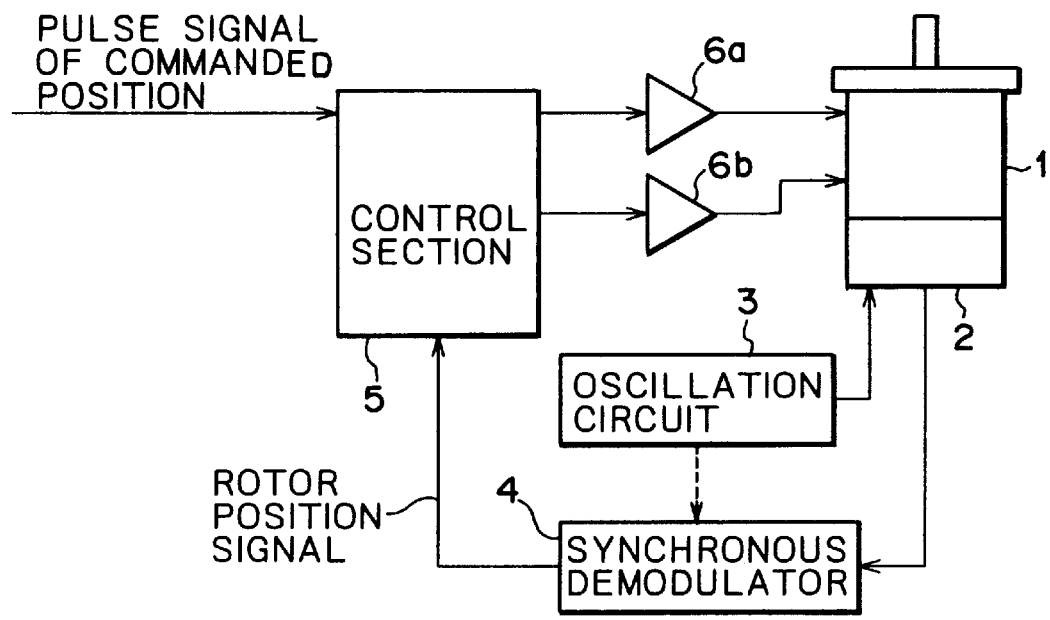
FIG. 2 is a block structural diagram depicting a control apparatus for a position control motor according to a first embodiment of this invention.

FIG. 2 is a block structural diagram depicting a control apparatus for a position control motor according to the first embodiment of this invention, and FIG. 3 is a block structural diagram of a control section in this control apparatus.

In FIG. 2, reference numeral "1" denotes a stepping motor which is a 2-phase hybrid type brushless motor. The stepping motor 1 has fifty small teeth formed on the outer surface of its rotor. A VR type resolver is attached to the rotor shaft of the motor 1 as a position detector 2 for the rotor. The position detector 2 is supplied with a high frequency signal of about 100 kHz from an oscillation circuit 3 and outputs a sine-wave signal in accordance with a change in the inductance of the sensor pole that is caused as the position of the rotor changes. This output sine-wave signal is converted by a synchronous demodulator 4 to a sine function of the rotational angle of the rotor, which is in turn input to a control section 5 as a feedback amount. Reference numerals "6a" and "6b" are power amplifiers which serve as a drive section for the motor 1.

Referring to FIG. 3, the control section 5 compares an input command position pulse signal with a rotor position pulse signal which is the output signal of the position detector 2 converted into a pulse signal by a position decoder 12, performs computation based on a deviation between the two pulse signals, and outputs signals corresponding to electric currents that should flow in the A-phase and B-phase windings of the motor 1. The position of the motor 1 is controlled by respectively supplying 2-phase powers to the A-phase and B-phase winding& of the motor 1 from the amplifiers 6a and 6b based on the output signals, and in accordance with the command position pulse signal.

The control section 5, for which a 32-bit CPU (Central Processing Unit) is used, updates its output signals as electric current commands (hereinafter referred to as "current commands") for the A-phase and B-phase of the motor 1 every control period of 100 $\mu$s.

The control section 5 comprises a commanded position counter 11 which counts the command position pulse signal, a rotor position counter 13, which counts the rotor position pulse signal converted from the output signal of the position detector 2 by the position decoder 12, a phase computing section 14 which receives the pulse signals from both counters 11 and 13 and outputs an address signal for a sine-wave data table (or sine-wave table) 15 from a deviation between the two pulse signals, and the sine-wave data table 15 which outputs a sine-wave data signal in association with the address signal from the phase computing section 14.

When the deviation between the pulse signals from the two counters 11 and 13 lies within an electric angle of 90 degrees, the phase computing section 14 outputs an address signal based on the command position pulse signal, allowing a sine-wave data signal corresponding to that address signal to be output as a current command from the sine-wave data table 15.

When this deviation exceeds the electric angle of 90 degrees, the phase computing section 14 corrects the phase of the rotor position pulse signal of the motor 1 by an electric angle of 90 degrees, and outputs an address signal based on the rotor position pulse signal, permitting a sine-wave data signal corresponding to that address signal to be output as a current command from the sine-wave data table 15.

Sine-wave data signals corresponding to 1000 addresses from "0" to "999" have been stored in advance in the sine-wave data table 15 in association with the A-phase electric current (hereinafter referred to as "current") and the B-phase current of the motor 1, as shown in FIGS. 4A and 4B, and a data signal corresponding to the address signal is output from the sine-wave data table 15 as a current command.

As the phases of the A-phase and B-phase currents are shifted by an electric angle of 90 degrees, the B-phase current data signal is an address signal which is "250" added to the address signal from the phase computing section 14.

If the output data signal from the sine-wave data table 15 has one period consisting of addresses "0" to "999," and the motor 1 makes a 1/50 turn (7.2 degrees in terms of a machine angle) during one period. Accordingly, the amount of rotation per address becomes 0.0072 degree and the resolution becomes 1/50000 rotation.

A command value for the amount of the rotation of the motor 1 is input in the form of a pulse signal. This input pulse signal is counted by the command position counter 11, which executes count-up within a range of 0 to 999 when the motor 1 rotates in the forward direction but count-down within that range when the motor 1 rotates in the reverse direction. Information on the rotor position is fed back as an analog quantity from the position detector 2, and is converted to a digital quantity by the position decoder 12. The digital data is then counted by the rotor position counter 13. The counting range, like that for the commanded position counter 11, is from "0" to "999."

The phase computing section 14 always monitors a deviation between the commanded position and the rotor position by subtracting one count value of the above two from the other. The phase computing section 14 computes the phase of the current to be supplied to the motor 1 from the count value of the command position counter 11, the count value of the rotor position counter 13 and the deviation therebetween, and outputs this current phase as an address signal to the sine-wave data table 15.

The computation of the current phase is basically carried out in the following procedures.

When the deviation count value is within a range of ±250 (±90 degrees in terms of an electric angle), the count value of the commanded position counter 11 is directly sent to the sine-wave data table 15 as the current phase.

When the deviation count value exceeds ±250, a value obtained by adding "250" to the count value of the rotor position counter 13 is sent to the sine-wave data table 15 as the current phase. When the deviation count value is smaller than –250, a value obtained by subtracting "250" from the count value of the rotor position counter 13 is sent to the sine-wave data table 15 as the current phase. In this case, it would be the same if the current is inverted by the count value of the rotor position counter 13 plus "250."

When the motor 1 rotates, the drive current of the motor 1 actually has a phase delay due to a time delay which is originated from the computation time and the inductance of the windings. In view of such phase delay, therefore, the phase computing section 14 uses proper speed correction that is proportional to the rotational speed of the motor 1.

Figure 5B:
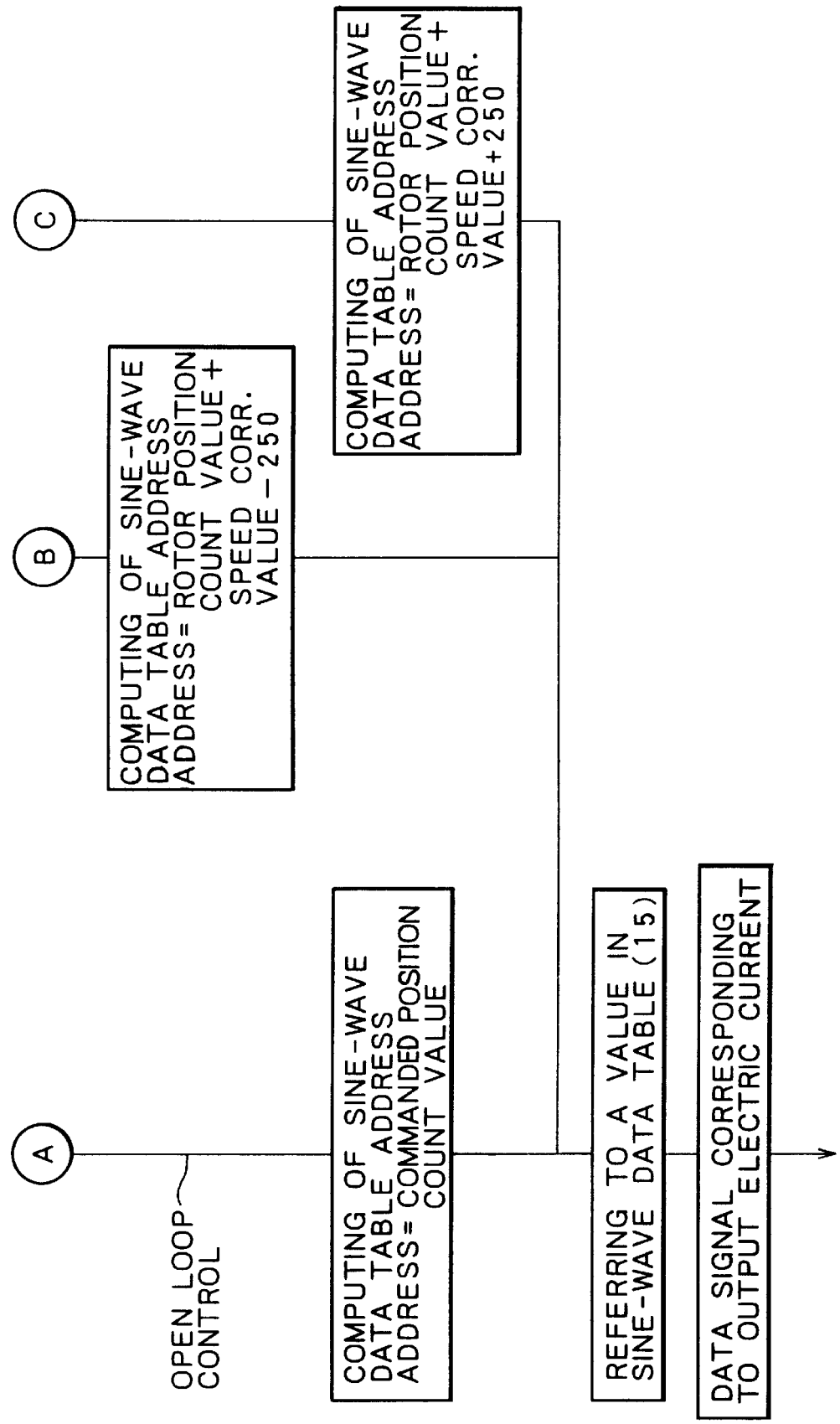
FIG. 5 is a flowchart for control in which motor speed correction in a phase computing section and the sine-wave data table is taken into consideration.

FIG. 5 is a flowchart for control in which this speed correction is taken into consideration in the phase computing section 14 and in the sine-wave data table 15.

Further, the resolution can be altered by changing the number of counts per one pulse of the command position signal through computation. Furthermore, the current to be supplied to the motor 1 is changed in accordance with the running condition, e.g., 1.5 times greater when accelerating or decelerating or smaller by 0.5 times when the motor is being stopped, so that the torque needed for the positioning operation can be generated while suppressing a rise in the temperature of the motor 1.

As described above, this embodiment, which employs closed loop control, demonstrates the following effects.

(1) The control is simple and easy so that position control can be carried out without using complicated control theories.

(2) There is no hunting at the time of positioning the rotor.
(3) The control-originated delay is small enough to ensure higher responses to commands.
(4) No adjustment is needed against load variations.

Second Embodiment

An excitation sequence control section in a control apparatus for a stepping motor according to the second embodiment normally receives a deviation range signal and a deviation direction signal, and generates an excitation sequence which allows a commanded position specified by a position command value to be a stable point when the deviation range signal lies within a predetermined range. When the deviation range signal lies outside the predetermined range, the excitation sequence control section generates an excitation sequence which allows a position corresponding to the rotor position to be a stable point, based on a detected value from a position detecting section which detects the rotor position of the motor, and the deviation direction signal.

Figure 6:
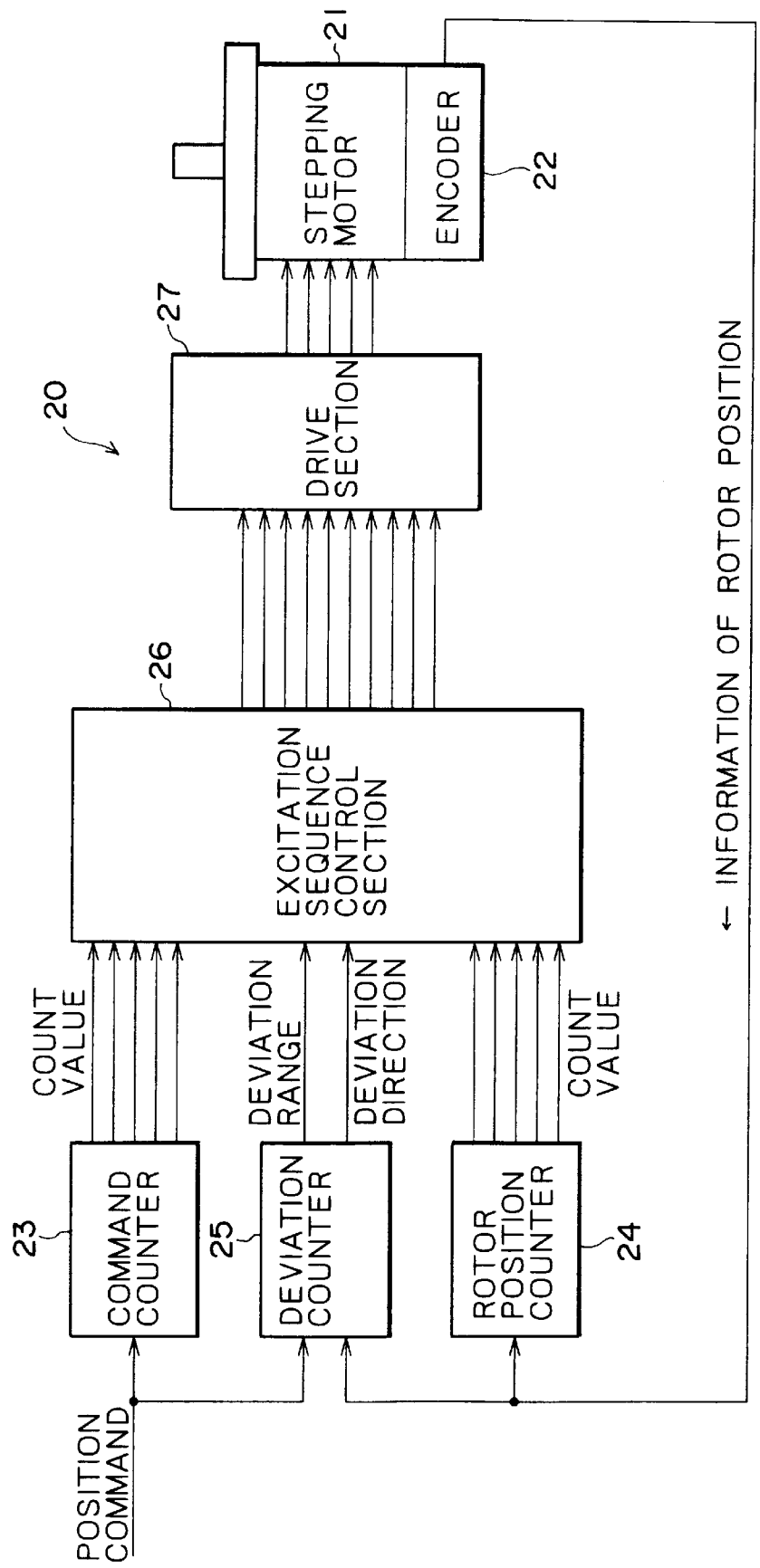
FIG. 6 is a block structural diagram illustrating a control apparatus for a position control motor according to a second embodiment of this invention.

FIG. 6 is a block structural diagram illustrating the control apparatus for a position control motor according to the second embodiment of this invention, and FIGS. 7A through 7C are diagrams showing the contents of data corresponding to addresses which are stored in a ROM in the excitation sequence control section of the control apparatus.

Referring to FIG. 6, a control apparatus 20 for a position control motor comprises a stepping motor 21, an encoder 22 as a position detector which is to be attached to the rotor of the motor 21, a command counter 23, a rotor position counter 24, a deviation counter 25, an excitation sequence control section 26 and a drive section 27 which drives the motor 21.

The stepping motor 21 is a 5-phase hybrid type stepping motor which has fifty small teeth formed on the outer surface of its rotor. The encoder 22 which outputs 1000 pulses per rotation is attached to the rotor shaft of the motor 21 as a position detector for the rotor. A pulse signal is used as a position command, and the mount of movement and the moving speed are designated by the number of pulses and the pulse frequency, respectively.

The command counter 23 which is an up-down counter of modulo 20 counts a pulse signal which is given as a position command and outputs a 5-bit binary signal of "0" to "19." The rotor position counter 24, which is also an up-down counter of modulo 20, counts a 2-phase pulse signal as a position detection signal which is output from the encoder 22, and outputs a 5-bit binary signal of "0" to "19."

The deviation counter 25 counts a difference between the position command pulse and the rotor position pulse (feedback pulse) from the encoder 22. The deviation counter 25 outputs two 1-bit pulse signals which respectively indicate the deviation direction and the deviation range.

With regard to the deviation direction, the deviation counter 25 outputs an H (High) signal when the deviation is positive (position command value>position detection value) and 0, and outputs an L (Low) signal when the polarity is negative. As the deviation range signal, the deviation counter 25 outputs an H signal when the number of pulses is greater than ±5, and outputs an L signal when the number of pulses does not exceed ±5.

The excitation sequence control section 26, comprised of a ROM, is supplied with signals of a total of 12 bits, the 5-bit binary signals sent from the command counter 23 and the rotor position counter 24 and the 2-bit signal sent from the deviation counter 25, and outputs a 10-bit signal for controlling the ON/OFF actions of switching elements Q1, Q2, . . . , and Q10 of the drive section 27 at the subsequent stage.

Stored in the excitation sequence control section 26 or ROM are data as shown in FIGS. 7A, 7B and 7C which show irrelevant data with marks "X." Each 5-bit data output from the command counter 23 and the rotor position counter 24 is expressed by a decimal notation. The numerals in the item "excitation position" represent the statuses of the excitation sequence that controls the ON/OFF actions of the ten switching elements Q1, Q2, . . . , and Q10 in the drive section 27.

Figure 8:
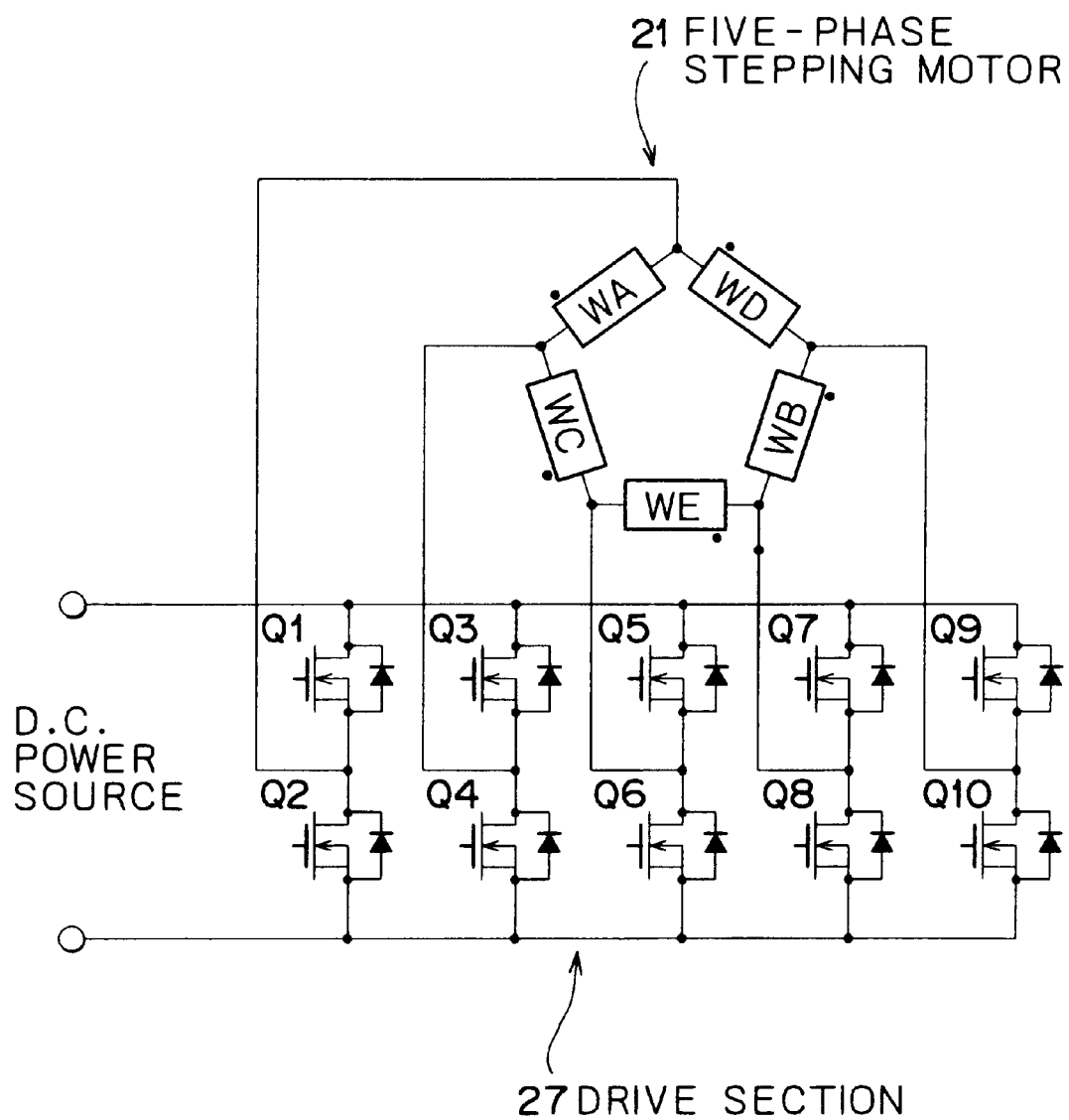
FIG. 8 is a connection diagram of a drive section, which comprises switching elements and a 5-phase stepping motor.

FIG. 8 presents a connection diagram of the drive section 27 and the 5-phase stepping motor 21. The drive section 27 is a half bridge inverter circuit which is comprised of the ten switching elements Q1, Q2, . . . , and Q10, and in which five pairs of series connected switching elements Q1 and Q2, Q3 and Q4, Q5 and Q6, Q7 and Q8, and Q9 and Q10 are connected in parallel to a DC power source.

The nodes between the paired switching elements Q1 and Q2, Q3 and Q4, Q5 and Q6. Q7 and Q8, and Q9 and Q10 are respectively connected to the nodes among individual phase windings WA, WD, WB, WE and WC of the stepping motor 21, which are connected in a pentagonal form as a ring shape. In this case, the pentagonal connection of the individual phase windings WA, WD, WB, WE and WC of the stepping motor 21 is made by sequentially connecting the start point of one winding to the end of another winding.

FIG. 9 shows the excitation sequence (half-step driving of 4-5-phase excitation) of the 5-phase stepping motor 21 which is executed by the excitation sequence control section 26 via the switching elements Q1, Q2, . . . , and Q10 of the drive section 27. In the figure, each mark "○" indicates the ON status of the associated switching element.

As the excitation sequence is changed over step by step, the electric phase of the torque generated is shifted by 18 degrees at a time and the motor 21 rotates by a 1/20 pitch of the rotor teeth at a time. That is, as the motor 21 has 50 rotor teeth, the motor 21 rotates by (1/50)×(1/20)=1/1000 in one step.

The operation of this embodiment will now be described.

Given that the pitch of the rotor teeth is treated as one cycle, normally, the relationship between the torque, which is generated by the stepping motor 21 when the motor 21 is excited by a specific excitation sequence, and a displacement with respect to the excitation stable point is approximated to a sine wave. In this case, the torque generated becomes maximum at a position shifted by a 1/4 pitch, and at a position shifted by a 1/2 pitch, the torque generated changes its direction and the rotor will not return to the original stable point.

When the motor 21 has a deviation of over a 1/4 pitch that maximizes the torque, the control apparatus 20 of this embodiment controls change-over of the excitation sequence by means of the excitation sequence control section 26 based on the rotor position detection signal from the encoder 22 in such a way as to generate the torque that always causes the rotor to move toward the specified excitation stable point, thereby preventing step out of the motor 21.

The 1/4 pitch is equivalent to five pulses of the resolution of the motor 21 or the resolution of the encoder 22.

Figure 10:
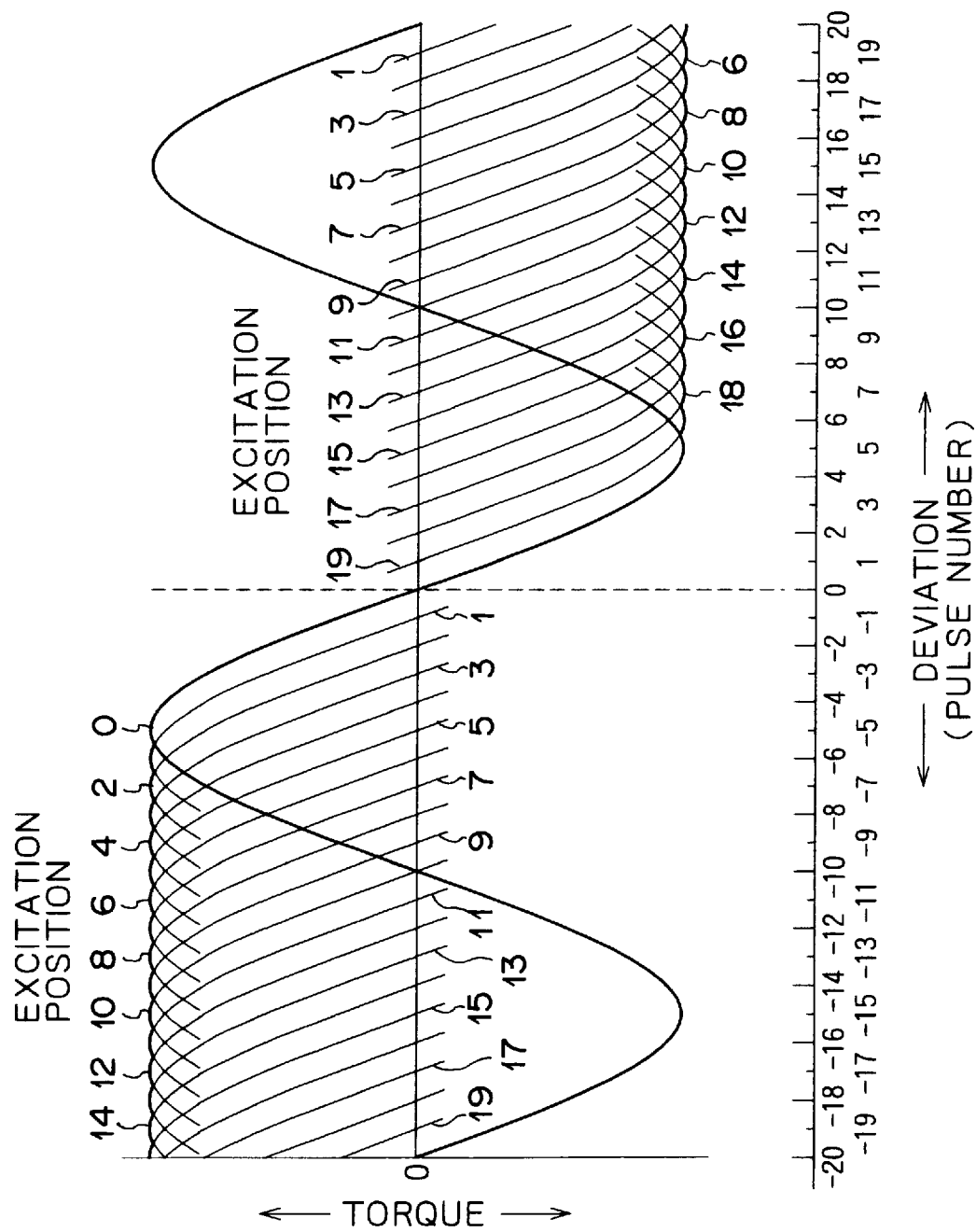
FIG. 10 is a diagram showing the relationship between the generated torque and the deviation of the rotor position of a stepping motor (or displacement expressed by the number of pulses) when excitation is carried out at an excitation position 0 as the initial state.
Figure 11:
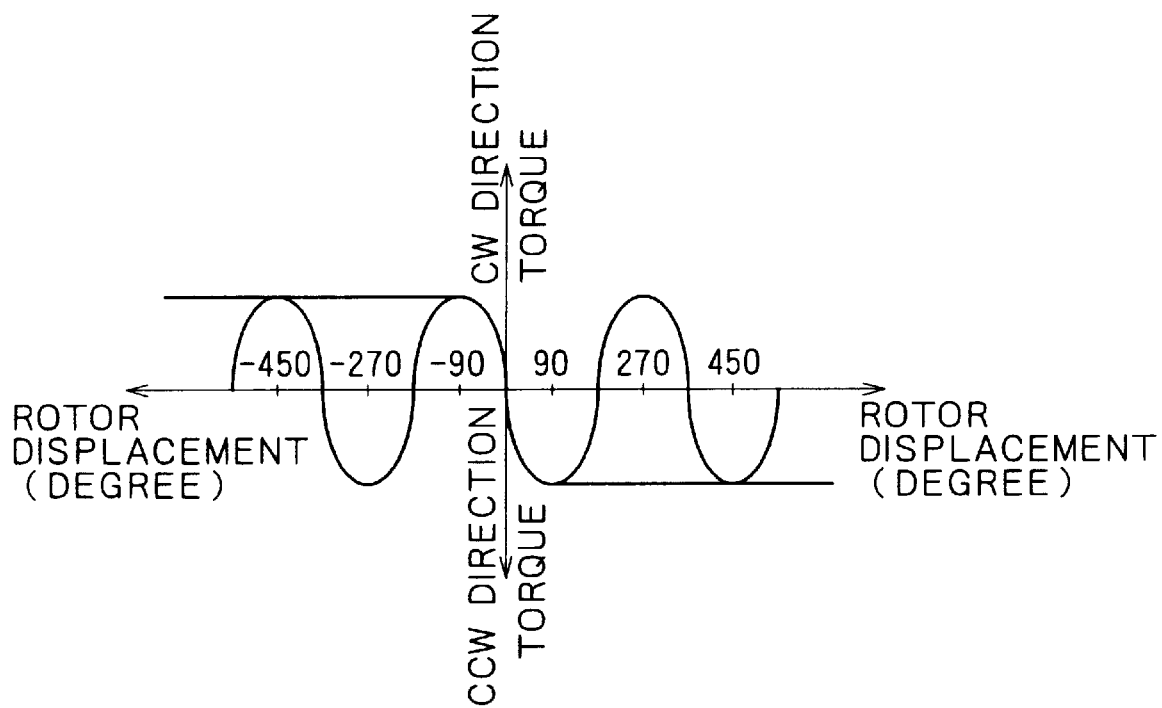
FIG. 11 is a diagram showing the relationship between the rotor displacement of a position control motor relating to this invention and the generated torque.

FIG. 10 illustrates the relationship between the generated torque and the deviation of the rotor position of the motor 21 (or displacement expressed by the number of pulses) when excitation is carried out at an excitation position 0 as the initial state. With no external force applied then, the count value of the rotor position counter 24 is "0" and the motor 21 is stopped. FIG. 10 shows the full waveform of the torque generated at the excitation position "0," but shows only the mutual phase relationship among the waveforms of the torques generated at the other excitation positions 1, 2, 3, ..., and 19, omitting the other waveform portions.

In this case, the individual initial states take the following values as apparent from FIG. 7A.
- deviation range signal: L,
- deviation direction signal: H,
- command counter value: 0,
- rotor position counter value: 0, and
- excitation position: 0.

As external force is applied to the rotor to rotate the rotor shaft in the forward direction (in the CW direction as viewed from the shaft end), the count value of the rotor position counter 24 increases and the deviation value increases in the negative direction.

Since the deviation range signal remains "L" at this time while the count value does not exceed five pulses from the encoder 22, the excitation position is determined by the value specified by the position command and stays at "0."

When external force is applied to the rotor to rotate the rotor shaft in the reverse direction (in the CCW direction as viewed from the shaft end), on the other hand, the count value of the rotor position counter 24 decreases and the deviation value increases in the positive direction.

Since the deviation range signal is "H" at this time when the count value is greater than five pulses from the encoder 22, the excitation position is determined by the count value of the rotor position counter 24 and becomes the one shown in FIG. 7B. For example, when the detected value of the rotor position is "15," the excitation position becomes "0."

As external force is further applied to the rotor while the rotor shaft is rotating in the forward direction, thereby further turning the rotor shaft in the forward direction, so that the count value of the rotor position counter 24 becomes "6," the deviation range signal becomes "H" and the excitation position is determined by the count value of the rotor position counter 24 and the deviation direction signal. As apparent from FIG. 7C, the excitation position becomes "1" from the count value "6" of the rotor position counter 24 and the deviation direction signal "L."

Every time the count value of the rotor position counter 24 increases to "7," "8", "9" and so forth, the excitation position is changed to "2," "3," "4" and so forth, and the torque generated always causes the rotor to return to the initial position.

When the command position is changed by the pulse input signal or the displacement direction of the rotor is changed by external force, the motor 21 will always likewise generate the torque that causes the rotor to move to the command position, as apparent from FIGS. 7A to 7C, and will not suffer stepping out.

Modifications of this embodiment will now be discussed.

Although the stepping motor 21 in this embodiment has been described as a 5-phase stepping motor, it is obvious that a similar control apparatus can likewise control positioning of a 2-phase stepping motor, 3-phase stepping motor or a multi-phase stepping motor as well.

A similar control apparatus can easily control positioning of a linear drive motor or a linear stepping motor as well as a rotor type motor.

While the excitation sequence control section 26 is constructed by hardware using a ROM in this embodiment, a similar structure can be realized by software.

Although the encoder 22 which has the same resolution as that of the motor 21 is used in this embodiment, their resolutions should not necessarily be identical. Further, the encoder 22 is not restrictive, but other types of position detectors like a resolver can be used as well.

Although change-over of the deviation range signal is performed using a pulse which is equivalent to the ¼ pitch that maximizes the torque generated by the stepping motor, no step out control can be implemented at anywhere between 0 to a ½ pitch.

Further, control in a high-speed range can be accomplished by correcting the deviation range and the excitation position using a time-dependent change in position information of the motor or a rotational speed signal from a rotor speed detector instead of the position detection signal of the motor.

Furthermore, micro stepping drive can likewise be controlled if the count number of the rotor position counter 24 and the number of pieces of data in the excitation sequence control section 26 are increased.

The scope of this invention is not limited to the scopes of the above-described embodiments, but may be achieved by other means which have the same functions as those of the embodiments, and this invention can be modified in various other forms within the scope of the above-described structures.

What is claimed is:

1. A position control apparatus for a position control motor from the group consisting essentially of brushless motors and stepping motors, for controlling a position of said motor in accordance with a command position signal, comprising:

a position detecting section which detects a rotor position of said motor;

a control section which compares an output signal of said position detecting section with said command position signal and outputs signal corresponding to an electric current to flow in windings of said motor based on a deviation between said output signal and said command position signal; and a drive section which outputs an electric current to be supplied to said windings of said motor based on an output signal of said control section, wherein said control section outputs a sine-wave data signal corresponding to said command position signal according to a sine-wave data table when said deviation lies within an electrical angle of 90 degrees, and outputs a sine-wave data signal which excites said motor in such a way that said motor comes to a excitation stable point ahead of said rotor position by an electrical angle of 90 degrees according to said sine-wave data table when said deviation exceeds an electrical angle of 90 degrees.

2. A position control apparatus according to claim 1, wherein said control section includes a command position counter which counts a pulse signal of said command position signal, a rotor position counter which counts a position detection pulse signal from said position detecting section, a phase computing section which receives pulse signals from the two counters and outputs an address signal for said sine-wave data table based on a deviation between said received pulse signals, and said sine-wave data table which provides a sine-wave data signal in association with said address signal from said phase computing section, wherein said phase computing section outputs said command position pulse signal when said deviation lies within an electrical angle of 90 degrees, and when said deviation exceeds an electrical angle of 90 degrees, said phase computing section corrects said position detection pulse signal of the motor by an electrical angle of 90 degrees, and then outputs said position detection pulse signal.

3. A position control apparatus according to claim 2, wherein said phase computing section has a function of correcting a rotational speed of said motor by adding a adequate speed correction value to an electric angle of 90 degrees and by carrying out computation based thereon.

4. A position control apparatus for a position control motor from the group consisting essentially of brushless motors and stepping motors, for controlling a position of said motor in accordance with a command position signal, comprising:

a position detecting section which detects a rotor position of said motor;

a control section which compares an output signal of said position detecting section with said command position signal and outputs signal corresponding to an electric current to flow in windings of said motor based on a deviation between said output signal and said command position signal; and a drive section which outputs an electric current to be supplied to said windings of said motor based on an output signal of said control section, wherein said control section receives a deviation range signal and a deviation direction signal, and generate an excitation sequence which allows a position instructed by a position command value to be a stable point when said deviation range signal lies within a predetermined range, and when said deviation range signal lies outside said predetermined range, said control section generates an excitation sequence which allows a position corresponding to said rotor position to be a stable point, based on said detected value of said rotor position and said deviation direction signal.

5. A position control apparatus according to claim 4, wherein said control section controls a linear stepping drive position.

6. A position control apparatus according to claim 4, wherein said control section controls a micro stepping drive position.

7. A position control apparatus according to claim 4, wherein said control section further performs speed correction on said excitation sequence to be generated in response to said deviation range signal and said detected value of said rotor position.

* * * * *